(12) United States Patent
Kang et al.

(10) Patent No.: US 11,916,772 B2
(45) Date of Patent: Feb. 27, 2024

(54) METHOD AND APPARATUS WITH COMMUNICATION AND LINK SET-UP

(71) Applicant: Samsung Electronics Co., Ltd., Suwon-si (KR)

(72) Inventors: Joonseong Kang, Suwon-si (KR); Sang Joon Kim, Hwaseong-si (KR); Young Jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/381,849

(22) Filed: Jul. 21, 2021

(65) Prior Publication Data
US 2022/0116301 A1 Apr. 14, 2022

(30) Foreign Application Priority Data

Oct. 13, 2020 (KR) .................. 10-2020-0131987
Mar. 25, 2021 (KR) .................. 10-2021-0038643

(51) Int. Cl.
*H04L 43/12* (2022.01)

(52) U.S. Cl.
CPC .................. *H04L 43/12* (2013.01)

(58) Field of Classification Search
CPC ...... H04L 43/12; H04W 48/16; H04W 76/10; H04W 48/12
See application file for complete search history.

(56) References Cited

U.S. PATENT DOCUMENTS

| 5,079,768 | A | * | 1/1992 | Flammer ............. H04B 1/7156 370/349 |
| 5,919,216 | A | | 7/1999 | Houben et al. |
| 6,477,590 | B1 | * | 11/2002 | Habusha ............. H04L 47/193 710/29 |
| 7,092,353 | B2 | | 8/2006 | Laroia et al. |
| 7,379,775 | B2 | | 5/2008 | Parramon et al. |
| 7,417,482 | B2 | | 8/2008 | Elgebaly et al. |
| 7,634,536 | B2 | | 12/2009 | Halasz |

(Continued)

FOREIGN PATENT DOCUMENTS

| EP | 1 556 957 B1 | 2/2009 |
| JP | 2008-219605 A | 9/2008 |

(Continued)

OTHER PUBLICATIONS

McGregor et al., "Sub-50µ; W, 2.4 GHz Super-Regenerative Transceiver with Ultra Low Duty Cycle and a 675µw High Impedance Super-Regenerative Receiver" *2007 European Microwave Conference.* IEEE, 2007. (pp. 1322-1325).

(Continued)

*Primary Examiner* — John A Follansbee
*Assistant Examiner* — Fadi Haj Said
(74) *Attorney, Agent, or Firm* — NSIP Law

(57) ABSTRACT

A processor-implemented communication method includes: sequentially transmitting scan packets comprising information of current transmission frequencies to a target device while changing a transmission frequency of a control device within a scan frequency range; and receiving, from the target device, a return packet comprising information of a reception frequency of the target device corresponding to any one of the current transmission frequencies included in the scan packets.

17 Claims, 13 Drawing Sheets

(56) References Cited

U.S. PATENT DOCUMENTS

| | | |
|---|---|---|
| 7,693,103 B2 | 4/2010 | Champion et al. |
| 7,859,986 B2 | 12/2010 | Laroia et al. |
| 8,228,899 B2 | 7/2012 | Kim |
| 8,326,246 B2 | 12/2012 | Monat et al. |
| 8,593,985 B2 | 11/2013 | Oue et al. |
| 8,767,603 B2 | 7/2014 | Kurose et al. |
| 8,983,621 B2 | 3/2015 | Hou et al. |
| 9,083,424 B2 | 7/2015 | Otis et al. |
| 9,232,478 B2 | 1/2016 | Xu et al. |
| 9,386,934 B2 | 7/2016 | Parker et al. |
| 9,774,336 B2 | 9/2017 | Liu |
| 10,326,454 B2 | 6/2019 | Kuo et al. |
| 10,455,580 B2 | 10/2019 | Jin et al. |
| 11,382,101 B1* | 7/2022 | Chu ................. H04L 5/0044 |
| 2004/0131014 A1* | 7/2004 | Thompson, III .... H04L 12/1881 370/312 |
| 2006/0011338 A1 | 1/2006 | Hallundbaek |
| 2006/0039450 A1* | 2/2006 | Fulton ................. H04B 1/7156 375/E1.033 |
| 2006/0251025 A1 | 11/2006 | Kwon et al. |
| 2008/0065736 A1* | 3/2008 | Gross ................. G06Q 10/107 709/207 |
| 2017/0201281 A1 | 7/2017 | Kim et al. |
| 2018/0062515 A1 | 3/2018 | Jung |
| 2018/0133471 A1 | 5/2018 | Lee et al. |
| 2020/0092190 A1* | 3/2020 | Oshiba .................. H04L 47/00 |
| 2020/0178255 A1 | 6/2020 | Jin et al. |
| 2022/0085954 A1* | 3/2022 | Wang ...................... H04L 1/16 |

FOREIGN PATENT DOCUMENTS

| | | |
|---|---|---|
| JP | 5185735 B2 | 4/2013 |
| JP | 5224946 B2 | 7/2013 |
| JP | 5519683 B2 | 6/2014 |
| JP | 2018-56770 A | 4/2018 |
| JP | 2019-186747 A | 10/2019 |
| KR | 10-2019-0118104 A | 10/2019 |
| KR | 10-2020-0049482 A | 5/2020 |

OTHER PUBLICATIONS

Ibrahim, et al., "C29. A 0.22 nj/b 2.4 GHz Super-Regenerative QPSK Receiver." *2013 30th National Radio Science Conference (NRSC)*. IEEE, 2013. (pp. 393-400).

Kim, Kihyun, et al. "Low-power CMOS super-regenerative receiver with a digitally self-quenching loop." *IEEE Microwave and Wireless Components Letters* vol. 22 Issue Sep. 9, 2012, (pp. 486-488).

Kim, Sang Joon, et al. "Micro Bio Processor: a 0.144 cc 70uW closed loop platform for body implant electroceutical systems." *2019 IEEE Biomedical Circuits and Systems Conference (BioCAS)*. IEEE, 2019. (pp. 1-4).

Extended European Search Report dated Feb. 16, 2022 in counterpart European Patent Application No. 21192804.9 (8 pages in English).

* cited by examiner

METHOD AND APPARATUS WITH COMMUNICATION AND LINK SET-UP

CROSS-REFERENCE TO RELATED APPLICATIONS

This application claims the benefit under 35 USC § 119(a) of Korean Patent Application No. 10-2020-0131987, filed on Oct. 13, 2020, and Korean Patent Application No. 10-2021-0038643, filed on Mar. 25, 2021, in the Korean Intellectual Property Office, the entire disclosures of which are incorporated herein by reference for all purposes.

BACKGROUND

1. Field

The following description relates to a method and apparatus with communication and link set-up.

2. Description of Related Art

To establish a mutual communication channel, communication devices may exchange packets of a frequency band agreed in advance. In this process, an operating frequency may be relatively accurately set to a desired value using a frequency reference such as a crystal-based reference oscillator and a phase-locked-loop (PLL). Regarding this, a method of dividing into frequency sections and allocating them to a plurality of communication devices to efficiently operate an agreed frequency, a method of adjusting a communication timing for optimizing power consumption, and a method of preparing for a frequency offset of the reference oscillator or the PLL may be used. However, these methods are under the assumption that an operating frequency of the communication device can be set to the desired value.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented communication method includes: sequentially transmitting scan packets comprising information of current transmission frequencies to a target device while changing a transmission frequency of a control device within a scan frequency range; and receiving, from the target device, a return packet comprising information of a reception frequency of the target device corresponding to any one of the current transmission frequencies included in the scan packets.

The receiving of the return packet may include receiving the return packet while changing a reception frequency of the control device within a return frequency range.

The received return packet may correspond to one of the return packets transmitted by the target device, and a transmission frequency of the target device may be determined based on a reception frequency at which the control device receives the return packet.

Each of the scan packets further may include return timing information comprising a total number of the scan packets, an index of a current scan packet, and a transmission period.

The return packet may be received after a waiting time indicated by the return timing information.

The return packet further may include identification information of the target device.

In response to a first link set-up between the control device and the target device and a second link set-up between the control device and another target device being performed simultaneously, the return packet may be distinguished from another return packet of the other target device based on the identification information of the target device.

Each of the scan packets further may include return procedure information comprising a total number of return packets and a return period.

Each of the return packets further may include information of an index of a current return packet, and a waiting time remaining to a termination of a return procedure may be identified based on the return procedure information and an index of the return packet.

The method may include: receiving, from a control device, one of the scan packets; identifying, by the target device, a reception frequency of the target device from the information of the current transmission frequency included in the one scan packet; and sequentially transmitting, to the control device, return packets including the return packet.

A non-transitory computer-readable record medium may store instructions that, when executed by a processor, configure the processor to perform the method.

In another general aspect, a processor-implemented communication method includes: receiving, from a control device, a scan packet comprising information of a transmission frequency of the control device; identifying a reception frequency of a target device from the information of the transmission frequency of the control device; and sequentially transmitting, to the control device, return packets, each comprising information of the reception frequency of the target device.

The received scan packet may correspond to one of scan packets transmitted by the control device at different frequencies within a scan frequency range, and each of the scan packets may include information of a current transmission frequency.

The target device may communicate with the control device without using a frequency reference.

The scan packet further may include return timing information comprising a total number of scan packets, an index of a current scan packet, and a transmission period.

The return packets may be transmitted after a waiting time indicated by the return timing information.

Each of the return packets further may include identification information of the target device.

The scan packet further may include return procedure information comprising a total number of return packets comprising the return packet and a return period.

In another general aspect, a processor-implemented communication method may include: transmitting, at different transmission frequencies within a scan frequency range, scan packets each including information of a transmission frequency of the scan packet; and receiving a return packet by changing a reception frequency within a return frequency range.

The method may include determining a reception frequency of a target device based on the return packet.

The return packet may include target reception frequency information generated based on one of the information of the transmission frequency of one of the scan packets, and the determining of the reception frequency of the target device may include determining the reception frequency based on the target reception frequency information.

The return packet may be generated by a target device without using a frequency reference.

Other features and aspects will be apparent from the following detailed description, the drawings, and the claims.

Figure 1A:
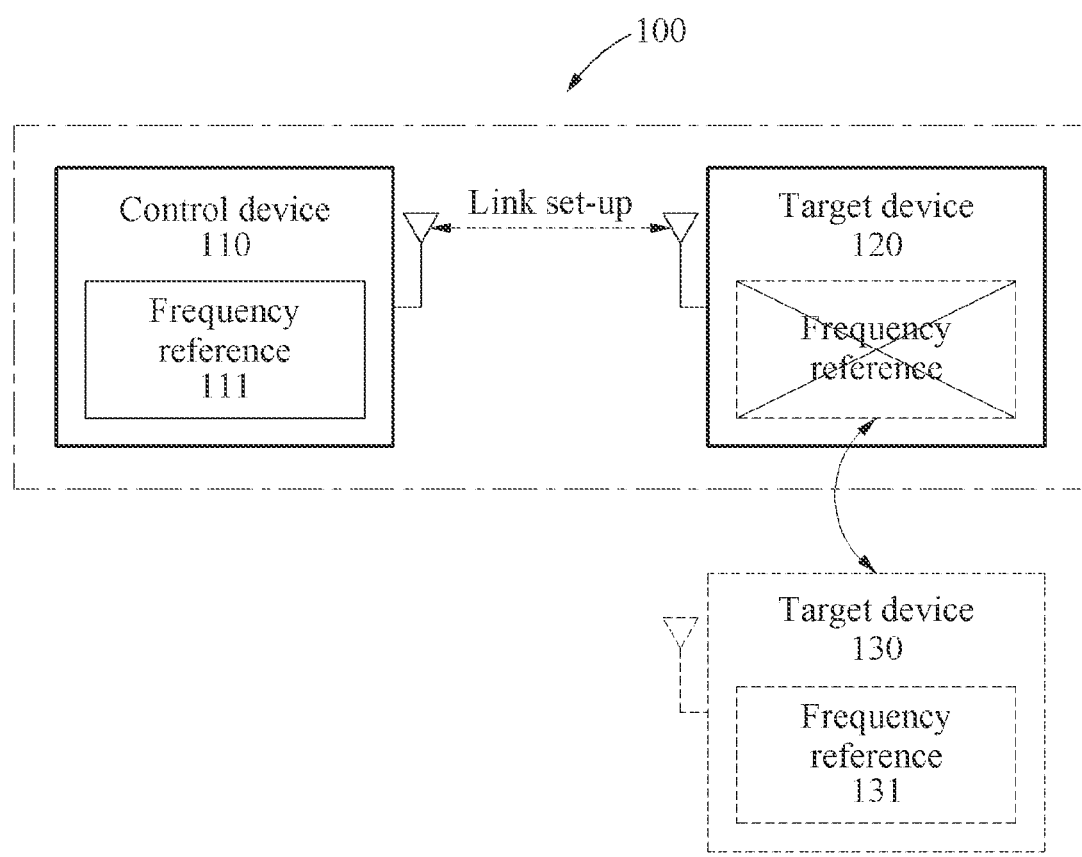
FIG. 1A illustrates an example of a communication system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Hereinafter, examples will be described in detail with reference to the accompanying drawings. It should be understood, however, that there is no intent to limit this disclosure to the particular examples disclosed. On the contrary, examples are to cover all modifications, equivalents, and alternatives falling within the scope of the examples.

The terminology used herein is for the purpose of describing particular examples only and is not to be limiting of the present disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of examples, detailed description of well-known related structures or functions will be omitted when it is deemed that such description will cause ambiguous interpretation of the present disclosure.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

A component having a common function with a component included in one example is described using a like name in another example. Unless otherwise described, a description made in one example may be applicable to another example and a detailed description within a duplicate range is omitted.

FIG. 1A illustrates an example of a communication system. Referring to FIG. 1A, a communication system 100 may include a control device 110 and a target device 120.

The control device 110 may control an operation of the target device 120 through a communication with the target device 120 and receive data stored or located inside the target device 120, and/or data acquired by the target device 120, from the target device 120. Although FIG. 1A illustrates that the communication system 100 includes a single control device 110 and a single target device 120, the communication system 100 may include at least one of the control device 110 and the target device 120 as a plural form (e.g., two or more control devices 110 and two or more target devices 120).

The control device 110 and the target device 120 may perform a link set-up to establish a mutual communication connection. Also, in this link set-up process, the control device 110 and the target device 120 may find out or determine operating frequencies of each other. An operating frequency may include a transmission operating frequency (hereinafter, referred to as a "transmission frequency") and a reception operating frequency (hereinafter, referred to as a "reception frequency"). The control device 110 and the target device 120 may communicate through the found operating frequencies. For example, when the operating frequency of the target device 120 is found out by the control device 110 through a link set-up procedure, the control device 110 may transmit a signal to the target device 120 by adjusting a transmission frequency of the control device 110 based on a reception frequency of the operating frequency of the target device 120, and receive a signal from the target device 120 by adjusting a reception frequency of the control device 110 based on a transmission frequency of the operating frequency of the target device 120.

A typical link set-up procedure may be on the premise that an operating frequency may be set as a desired value at a high reliability. Referring to FIG. 1A, the control device 110 includes a frequency reference 111, and a target device 130 includes a frequency reference 131. For reference, in FIG. 1A, the target device 130 is shown not as part of the communication system 100 but for comparison with the target device 120. For clear distinction from the target device 130, the target device 120 may also be referred to as "low-power target device" below.

The control device 110 may set the operating frequency of the control device 110 to a desired or determined value through or based on the frequency reference 111. The target device 130 may set the operating frequency of the target device 130 to a desired or determined value through or based on the frequency reference 131. For example, the frequency references 111 and 131 may provide stable and highly reliable operating frequencies through a circuit such as a crystal-based reference oscillator and a phase-locked-loop (PLL). Non-limiting examples of the frequency references 111 and 131 will be further described with reference to FIG. 1B.

Figure 1B:
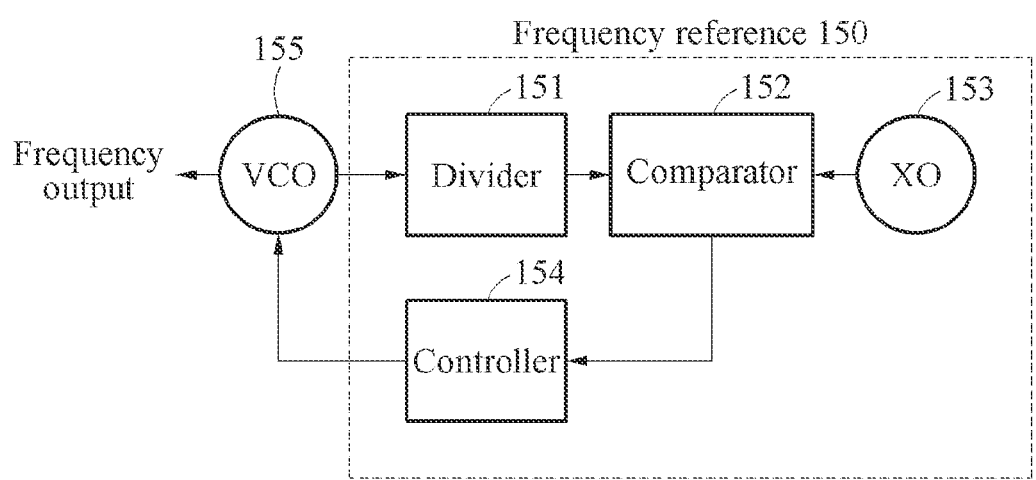
FIG. 1B illustrates an example of a frequency reference.

FIG. 1B illustrates an example of a frequency reference. Referring to FIG. 1B, a voltage-controlled oscillator (VCO) 155 may provide a frequency output. A frequency reference 150 may include a divider 151, a comparator 152, a crystal oscillator (XO) 153, and a controller 154. Using the aforementioned components, the frequency reference 150 may accurately set a frequency output of the VCO 155 and constantly maintain the set frequency output.

The comparator 152 may divide a frequency output of the VCO 155 using the divider 151, compare the divided frequency output to an accurate reference frequency of the XO 153, and output a signal corresponding to a difference therebetween. The controller 154 may control the VCO 155 using a control signal corresponding to an output of the comparator 152, thereby constantly maintaining the frequency output of the VCO 155. The frequency output of the VCO 155 may be adjusted based on a frequency division ratio of the divider 151. The frequency reference 150 is merely an example of the frequency references 111 and 131 of FIG. 1A. Thus, the frequency references 111 and 131 may be implemented in various ways different from that of the frequency reference 150.

Referring back to FIG. 1A, the control device 110 and the target device 130 may be provided with stable frequencies through the frequency references 111 and 131 and thus, may perform typical link set-up procedures using the frequencies. However, the frequency references 111 and 131 may consume a relatively large amount of power in a communication process. For example, for demodulation into a base band, a reception signal may be down-converted using a carrier signal generated internally. In a process of the down-conversion, a large amount of power may be used to drive the reference oscillator, the PLL, and the like.

The target device 120 may be designed not to include a configuration corresponding to the frequency references 111 and 131 consuming a large amount of power. For example, the target device 120 may include an element such as a super-regenerative oscillator that does not perform down-conversion instead of the frequency references 111 and 131. Through this, the power consumption of the target device 120 may be significantly reduced when compared to the target device 130. For example, the power consumption of the target device 120 may be less than 1 milliwatt (mW). In this case, the target device 120 may be used as a human-body implantable or attachable device or an ultra-low power device such as an Internet of things (IoT) node.

When the target device 120 does not include the configuration corresponding to the frequency references 111 and 131, the target device 120 may not verify an operating frequency of the target device 120 by itself. For example, there may be an error between an actual frequency and a frequency set by the target device 120. Such error may be generated due to variations of elements of the target device 120 affecting the operating frequency or environmental factors around the target device 120. Also, such error may reach, for example, several megahertz (MHz). A typical link set-up procedure may be based on an assumption that an operating frequency is set with a high reliability and thus, the typical link set-up procedure may be unsuitable for the target device 120 having such frequency error.

As will be described below, the control device 110 and the target device 120 of one or more embodiments may perform a link set-up procedure of one or more embodiments on the premise that a reliability of an operating frequency of the target device 120 set by the target device 120 is not high. The link set-up procedure of one or more embodiments may be performed dependent on the frequency references 111 of the control device 110 in general. Through the link set-up procedure, the operating frequency of the target device 120 may be identified. The link set-up procedure according to one or more embodiments may include a configuration corresponding to the frequency references 111 and 131 or a similar configuration in addition to the target device 120, and may also be used for a device of which a frequency setting accuracy is not high.

Hereinafter, non-limiting examples of the link set-up procedure of one or more embodiments between the control device 110 and the target device 120 are described in greater detail. In addition, a typical link set-up procedure is briefly described in order to help the understanding of the link set-up procedure of one or more embodiments between the control device 110 and the target device 120.

Figure 2:
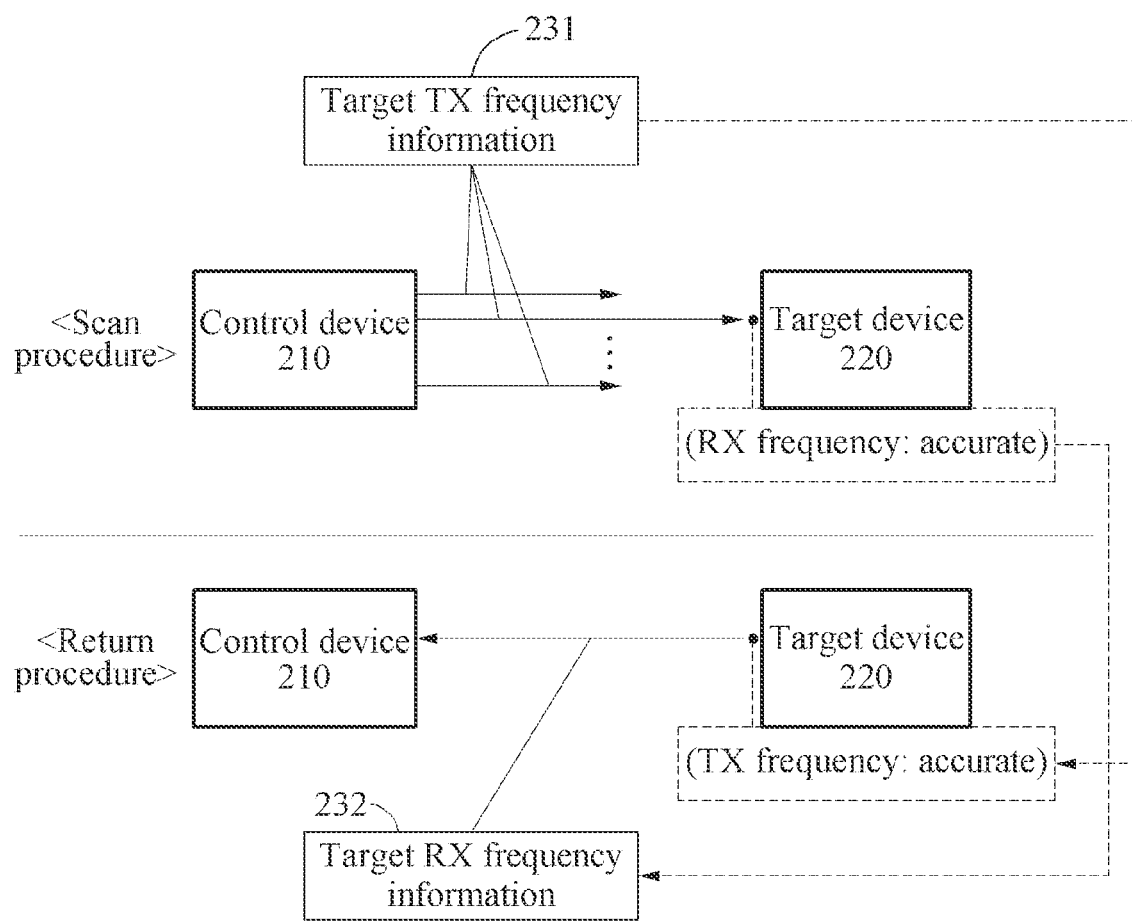
FIG. 2 illustrates an example of a typical link set-up procedure for a target device.

FIG. 2 illustrates an example of a typical link set-up procedure for a target device. A target device 220 of FIG. 2 corresponds to a typical target device like the target device 130 of FIG. 1A, and is under an assumption that an operating frequency may be set to a desired value through a frequency reference. Also, like the control device 110 of FIG. 1A, a control device 210 is under an assumption that an operating frequency may be set to a desired value through a frequency reference.

Referring to FIG. 2, a link set-up procedure may include a scan procedure and a return procedure. In the scan procedure, the control device 210 may transmit scan packets to the target device 220 while changing a transmission frequency of the control device 210 within a scan frequency range. In this process, the target device 220 may receive a scan packet matching a reception frequency of the target device 220 among the scan packets.

Each of the scan packets may include target transmission frequency information 231. The target transmission frequency information 231 may indicate a transmission frequency at which the target device 220 is to transmit a return packet to the control device 210 in response to a scan packet. A transmission frequency of the target device 220 for transmitting a return packet may be the same as a reception frequency of the control device 210 for receiving the return packet. Thus, a target transmission frequency may refer to a transmission frequency at which the target device 220 is to transmit a packet to the control device 210 and may also refer to a reception frequency at which the control device 210 is to receive the packet from the target device 220. When the reception frequency of the control device 210 is constant in general, the target transmission frequency information 231 of each scan packet may include information on the same frequency value.

In the return procedure, the target device 220 sets a transmission frequency of the target device 220 based on the target transmission frequency information 231 and transmits a return packet including target reception frequency information 232 to the control device 210. When the target device 220 corresponds to a typical target device like the target device 130 of FIG. 1A, the target device 220 may accurately set a transmission frequency and a reception frequency of the target device 220 through a frequency reference. Accordingly, a frequency at which a scan packet is received may guarantee that the frequency is the reception frequency of the target device 220. Also, a frequency at which a return packet is transmitted may guarantee that the frequency is a reception frequency of the control device 210 (for example, a frequency specified based on the target transmission frequency information 231).

Figure 3:
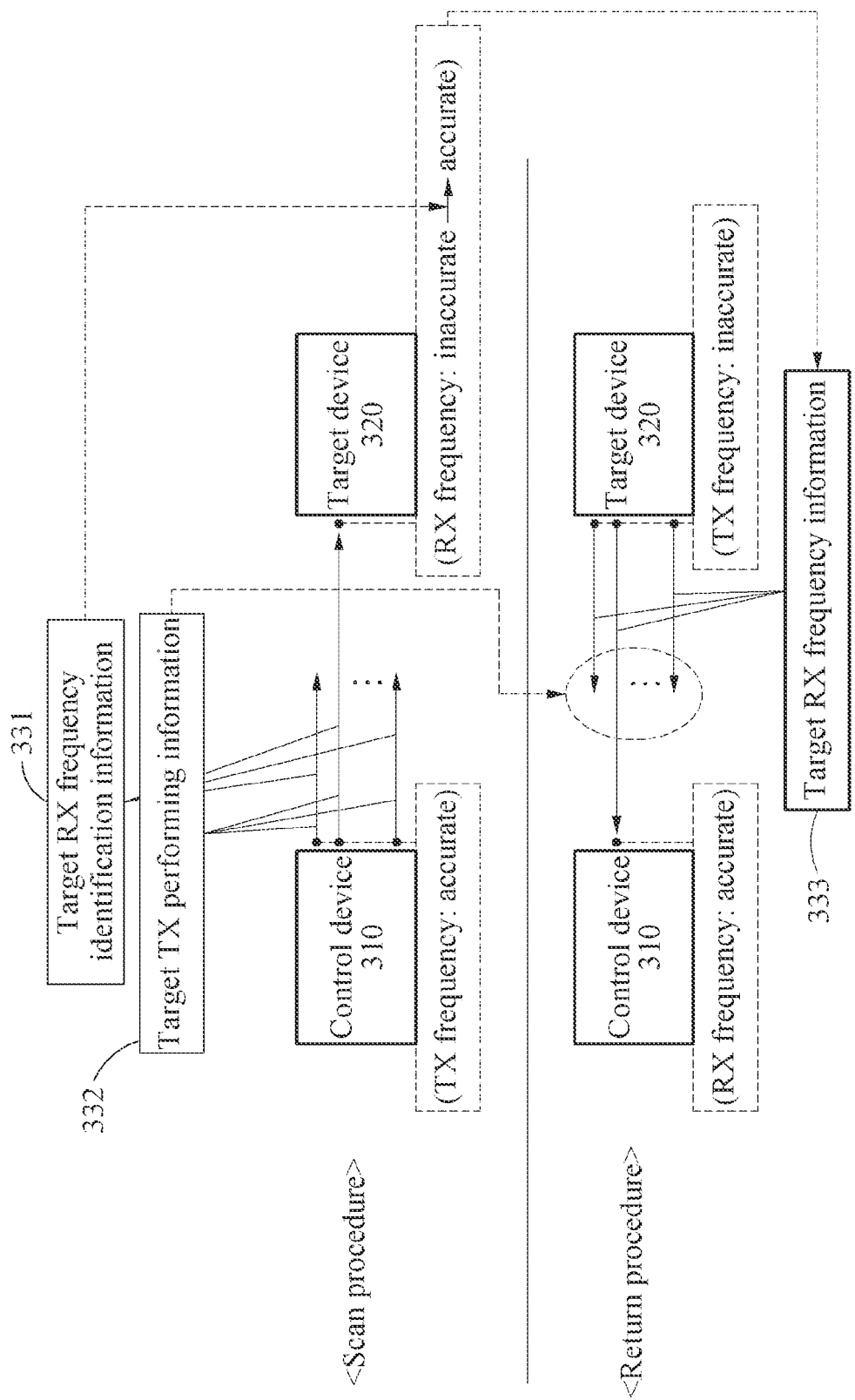
FIG. 3 illustrates an example of a link set-up procedure for a target device.

FIG. 3 illustrates an example of a link set-up procedure for a low-power target device. When a target device 320 of FIG. 3 corresponds to a low-power target device like the target device 120 of FIG. 1A and does not include a frequency reference, there may be a difference between an actual operating frequency value and a set frequency value of the target device 320. Like the control device 110 of FIG. 1A, a control device 310 assumes that an operating frequency may be set to a desired value through a frequency reference.

Referring to FIG. 3, a link set-up procedure may include a scan procedure and a return procedure like a typical link set-up procedure. In the scan procedure, the control device 310 may sequentially transmit scan packets to the target device 320 while changing a transmission frequency of the control device 310 within a scan frequency range. In this process, the target device 320 may receive a scan packet matching a reception frequency of the target device 320 among the scan packets.

Each of the scan packets may include target reception frequency identification information 331 and target transmission performing information 332. The target reception frequency identification information 331 may include information to be used by the target device 320 to identify its reception frequency. The target device 320 may set its reception frequency to a given frequency to receive a scan packet, but there may be a difference between an actual receiving operating frequency and the reception frequency set by the target device 320. This is because the low-power target device 320 may set an operating frequency without using a frequency reference. Therefore, the frequency given as the reception frequency may not be used as the actual reception frequency of the target device 320, and the link set-up procedure of one or more embodiments may therefore identify the actual reception frequency in another way.

Regarding this, the target reception frequency identification information 331 may include information on a current transmission frequency of the control device 310. For example, the control device 310 may transmit the scan packets to the target device 320 while changing the transmission frequency within the scan frequency range. At this time, information on a transmission frequency of each scan packet may be recorded in the corresponding scan packet. Through this, the target device 320 may identify its reception frequency based on reception frequency identification information 331 in the scan packet instead of a given frequency value or a frequency value set by itself.

When the control device 310 includes the frequency reference, a difference between the reception frequency identification information 331 of each scan packet and the transmission frequency, that is, the reception frequency of the target device 320 may be significantly small. Accordingly, when the target device 320 has received a scan packet, it can be seen that a frequency specified based on the reception frequency identification information 331 in the corresponding scan packet specifies the actual reception frequency of the target device 320 with the high reliability.

The target transmission performing information 332 may include information for guiding a return procedure. For example, the target transmission performing information 332 may include return timing information for specifying a waiting time remaining to initiate the return procedure and return procedure information for specifying a return method. The return timing information may include a total number of scan packets, an index of a current scan packet, and a transmission period. The return procedure information may include a total number of return packets and a return period. The target device 320 may perform the return procedure by referencing the target transmission performing information 332.

In the return procedure, the target device 320 may sequentially transmit the return packets to the control device 310. Each of the return packets may include target reception frequency information 333. The target device 320 may initiate the return procedure at a time specified based on the return timing information and transmit the return packets based on the return procedure information. The target device 320 may transmit the return packets at the same transmit frequency and at predetermined time intervals. Here, the same transmission frequency may refer to a transmission frequency set by the target device 320, and the total number of return packets and the return period may be specified based on the return procedure information. In this process, the control device 310 may receive one return packet among the return packets.

The target device 320 may set the target reception frequency information 333 based on the target reception frequency identification information 331 in the scan packet received by itself among the scan packets transmitted by the control device 310. As described above, it can be seen that a frequency specified based on the reception frequency identification information 331 in the scan packet received by the target device 320 specifies the actual reception frequency of the target device 320 with the high reliability. Accordingly, the control device 310 may find or determine the reception frequency of the target device 320 based on the target reception frequency information 333.

Like the reception frequency, the transmission frequency of the target device 320 may have an error. Thus, a method of informing the target device 320 of a target transmission frequency through a scan packet so that the target device 320 transmits return packet at the target transmission frequency like the typical link set-up procedure of FIG. 2 may not be accurate. Instead, in the link set-up procedure of FIG. 3 of one or more embodiments, the control device 310 may attempt to receive a return packet while changing its reception frequency within the return frequency range and may receive one of the return packets at a specific frequency within the return frequency range. At this time, a transmission frequency of the target device 320 may be determined based on a reception frequency at which the control device 310 receives the return packet. Since the operating frequency of the control device 310 has a high reliability, it can be seen that the frequency at which the control device 310 receives the return packet specifies the actual transmission frequency of the target device 320 with the high reliability. Accordingly, the control device 310 may find the transmission frequency of the target device 320 based on the reception frequency at which the control device 310 receives the return packet.

Figure 4:
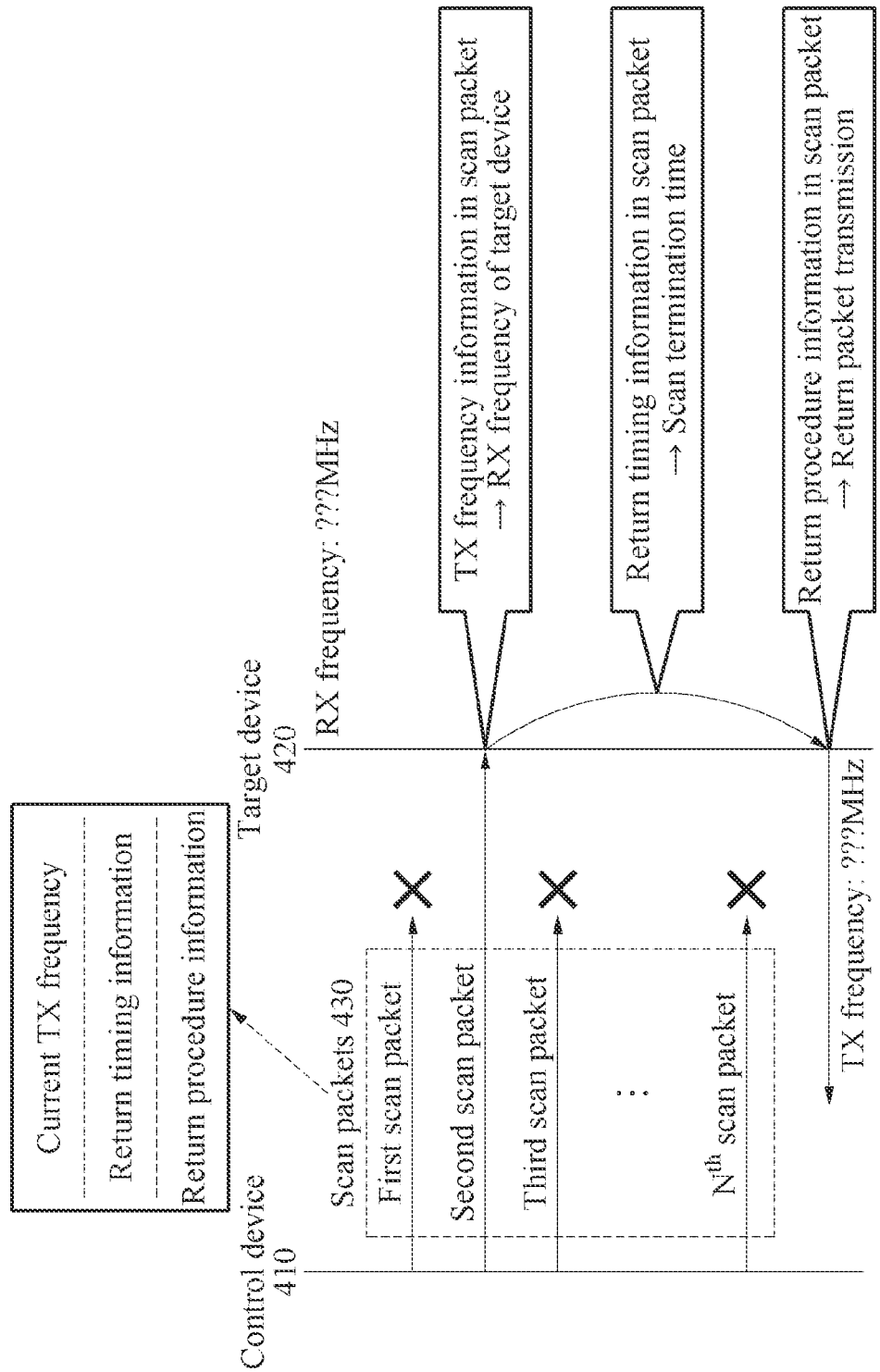
FIG. 4 illustrates an example of a scan process for a link set-up.

FIG. 4 illustrates an example of a scan process for a link set-up. Referring to FIG. 4, a control device 410 transmits scan packets 430 to a target device 420. The scan packets 430 may include a first scan packet through an $N^{th}$ scan packet. The scan packets may be sequentially transmitted at different transmission frequencies within a scan frequency range. Each of the scan packets may include a transmission frequency at which the corresponding scan packet is transmitted, as current frequency information. For example, when the scan frequency range is 400 megahertz (MHz) to 409 MHz, a current transmission frequency of the first scan packet may be 400 MHz, a current transmission frequency of a second scan packet may be 401 MHz, and a current transmission frequency of the $N^{th}$ scan packet may be 409 MHz. Here, N denotes a total number of scan packets. In the present example, N=10.

When the scan packets 430 are transmitted by the control device 410, the target device 420 may receive one of the scan packets 430. For example, the target device 420 may receive the second scan packet. When a current transmission frequency value of 401 MHz is stored in the second scan packet, the target device 420 may identify that a reception frequency of the target device 420 is 401 MHz based on current transmission frequency information of the second scan packet. The target device 420 may inform the control device 410 of information on its reception frequency through a return packet.

Each of the scan packets may further include return timing information and return procedure information. The target device 420 may specify a waiting time remaining to initiate a return procedure based on the return timing information. For example, the return timing information may include the total number of scan packets, an index of a current scan packet, and a transmission period. In this example, the waiting time may be obtained according to an equation of [(total number of scan packets−index of received scan packet)*transmission period]. For example, when the transmission period of the scan packet is five milliseconds (ms), the waiting time may be 40 ms (=(10−2)*5 ms). The target device 420 may transmit return packets after the waiting time elapses. At this time, the target device 420 may transmit the return packets based on the return procedure information. A non-limiting example of the return procedure will be described in greater detail with reference to FIG. 5.

Figure 5:
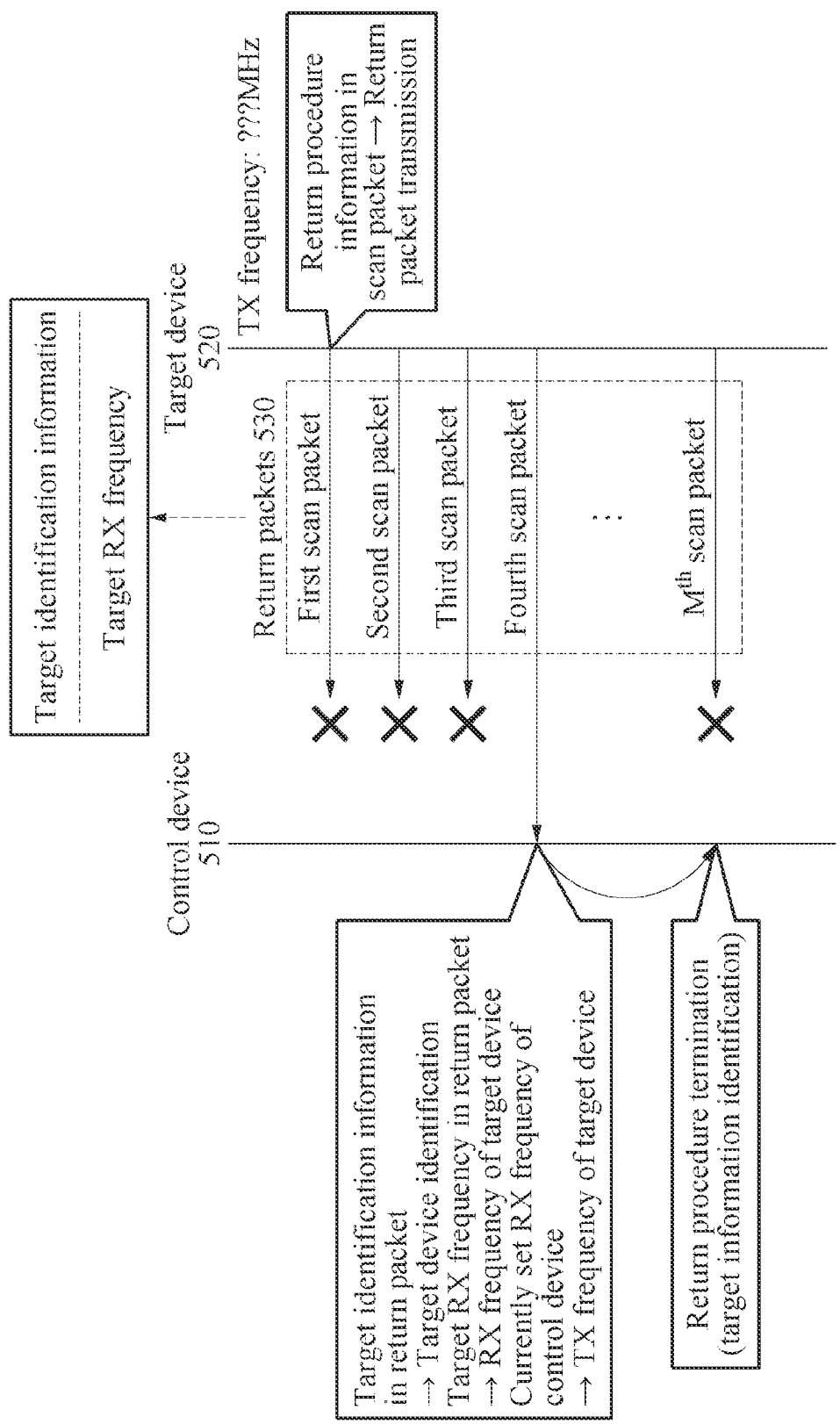
FIG. 5 illustrates an example of a return procedure for a link set-up.

FIG. 5 illustrates an example of a return procedure for a link set-up. Referring to FIG. 5, a target device 520 may sequentially transmit return packets 530 to a control device 510. The return packets 530 may include a first return packet through an $M^{th}$ return packet. Here, M denotes a total number of return packets. The target device 520 may transmit the return packets 530 based on return procedure information of a scan packet. The return procedure information may include the total number of return packets and a return period. For example, the total number of return packets may be 10, and the return period may be 10 ms.

In the present example, the target device 520 may transmit ten return packets 530 at intervals of 10 ms. At this time, each return packet may be transmitted at a transmission frequency set to the same value by the target device 520. Meanwhile, when the frequency value set by the target device 520 has a low reliability, there may be a significant difference between an actual value and the value set by the target device 520 for the transmission frequency of each return packet. Therefore, the transmission frequency of the target device 520 may be specified based on the reception frequency of the control device 510 instead of a frequency setting value of the target device 520.

The control device 510 may attempt to receive a return packet while changing the reception frequency of the control device 510 within a return frequency range and receive one of return packets at a specific frequency within the return frequency range. At this time, the transmission frequency of the target device 520 may be determined based on the reception frequency at which the control device 510 receives a return packet. For example, when the return frequency range is 400 to 409 MHz, the control device 510 may attempt to receive a return packet while changing the reception frequency in a range from 400 MHz to 409 MHz based on a return period. In this example, when the return packet is received at a specific reception frequency (e.g., 403 MHz) within the return frequency range, the control device 510 may determine the corresponding reception frequency to be the transmission frequency of the target device 520.

Each return packet may include target identification information and target reception frequency information. The control device 510 may identify the reception frequency of the target device 520 based on the target reception frequency information in the received return packet. The target identification information may be used to distinguish the target device 520 from another target device. Based on the target identification information, link set-up procedures for a plurality of target devices may be performed simultaneously. For example, when a link set-up between the control device 510 and the target device 520 a link set-up between the control device 510 and another target device are performed simultaneously, the return packets 530 may be distinguished from another return packet of another target device based on the target identification information. A non-limiting example of the link set-up procedures for the plurality of target devices will be described in greater detail with reference to FIG. 6.

Although not shown in FIG. 5, each of the return packets 530 may further include information on an index of a current return packet. In this case, the control device 510 may specify a waiting time remaining to terminate the return procedure based on the return procedure information and the index of the return packet. The waiting time may be obtained according to an equation of [(total number of return packets−index of received return packet)*the return period]. In the foregoing example, if the index of the return packet is 4, the waiting time may be 60 ms (=(10−4)*10 ms). When the waiting time elapses, the return procedure is terminated so that the control device 510 controls the target device 520 using the determined operating frequency of the target device 520.

Figure 6:
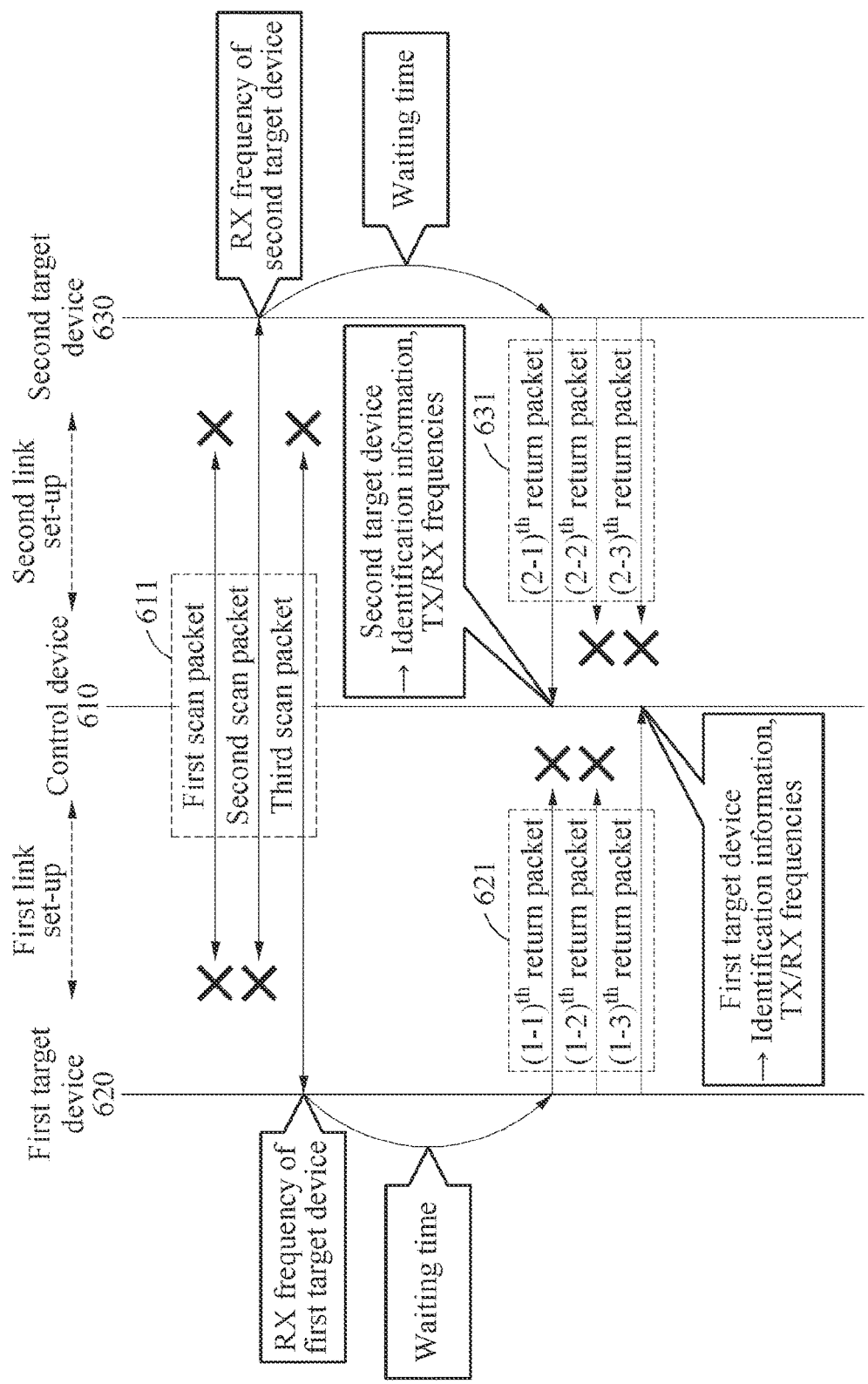
FIG. 6 illustrates an example of a link set-up procedure for a plurality of target devices.

FIG. 6 illustrates an example of a link set-up procedure for a plurality of target devices. Referring to FIG. 6, a control device 610 may perform a first link set-up along with a first target device 620 and perform a second link set-up along with a second target device 630. When the first target device 620 and the second target device 630 have different operating frequencies, a first link set-up procedure and a second link set-up procedure may be performed simultaneously.

The control device 610 may transmit scan packets 611 to the first target device 620 and the second target device 630, simultaneously. The first target device 620 may receive any one of the scan packets 611, for example, a third scan packet of the scan packets 611. Likewise, the second target device 630 may receive any one of the scan packets 611, for example, a second scan packet of the scan packets 611. In this case, a reception frequency of the first target device 620 may be determined based on a transmission frequency of the third scan packet, and a reception frequency of the second target device 630 may be determined based on a transmission frequency of the second scan packet.

When a waiting time elapses, return procedures may be initiated by the first target device 620 and the second target device 630. Based on return timing information in each scan packet, the return procedure of the first target device 620 and the return procedure of the second target device 630 may start simultaneously. The first target device 620 may transmit first return packets 621 to the control device 610. The second target device 630 may transmit second return packets 631 to the control device 610.

Each return packet may include target identification information. The first return packets 621 and the second return packets 631 may be distinguished based on the target identification information. The control device 610 may receive any one, for example, a $(1-3)^{th}$ return packet of the first return packets 621. In addition, the control device 610 may receive any one, for example, a $(2-1)^{th}$ scan packet of the second return packets 631. In this case, a transmission frequency of the first target device 620 may be determined based on a reception frequency of the $(1\times3)^{th}$ return packet. Also, a transmission frequency of the second target device 630 may be determined based on a reception frequency of the $(2-1)^{th}$ scan packet. The foregoing description given of the link set-up for the single target device may apply to the link set-up for a plurality of the target devices 620 and 630 of FIG. 6.

Figure 7:
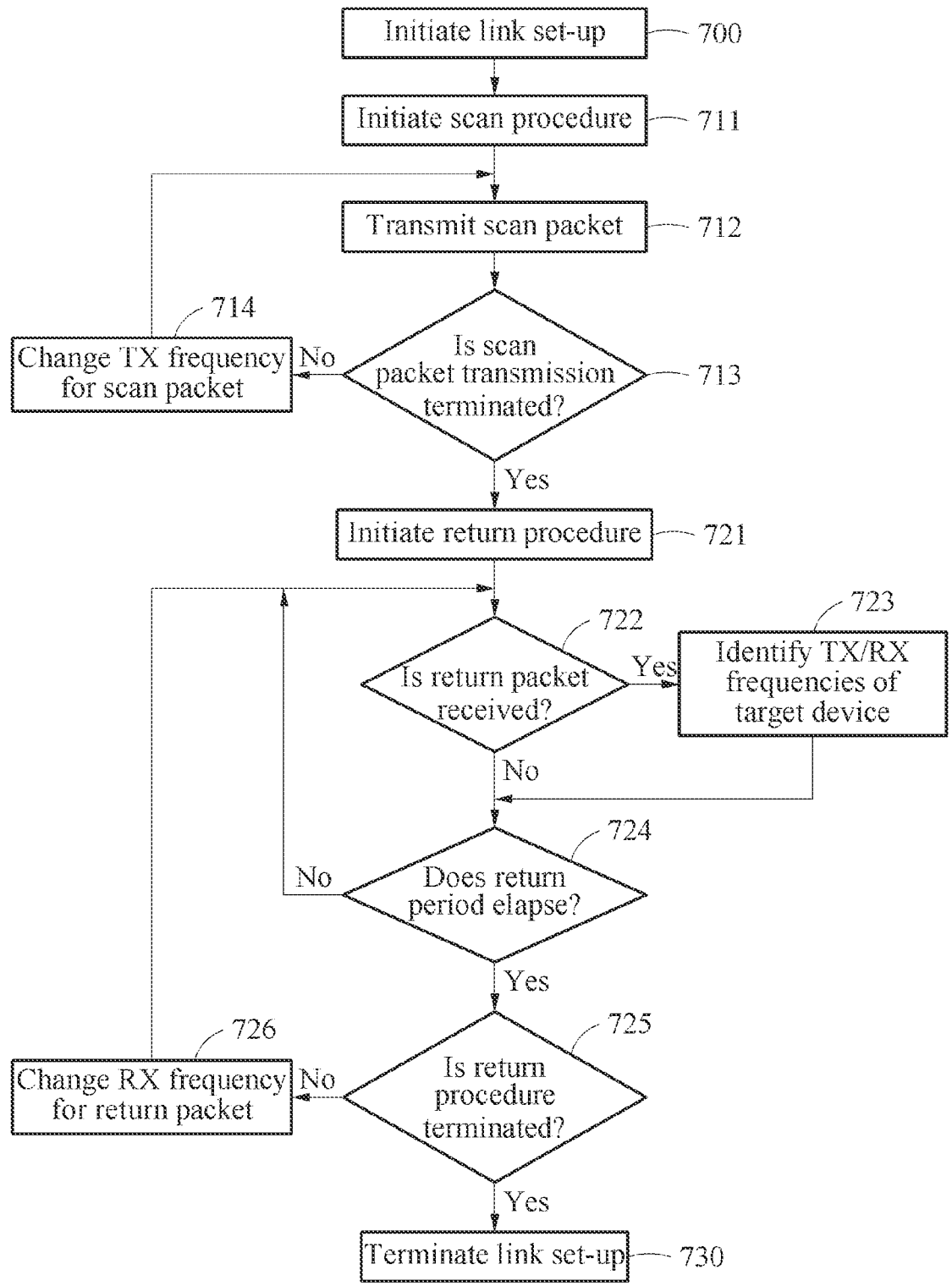
FIG. 7 illustrates an example of a link set-up procedure for a control device.

FIG. 7 illustrates an example of a link set-up procedure for a control device. Referring to FIG. 7, a link set-up may be initiated in operation 700. A scan procedure may be initiated in operation 711. In operation 712, the control device may transmit a scan packet. The control device may transmit a scan packet to a single target device or a plurality of target devices. In operation 713, the control device may determine whether the transmission of the scan packet is terminated. When the transmission of the scan packet is not terminated, the control device changes a transmission frequency for the scan packet in operation 714 and transmits the scan packet through the transmission frequency changed in operation 712. When the transmission of the scan packet is terminated, a return procedure is initiated in operation 721.

In operation 722, the control device may determine whether a return packet is received. When the return packet is received, the control device may identify a reception frequency and a transmission frequency of the target device in operation 723 and determine whether a return period elapses in operation 724. When the return packet is not received, the control device may perform operation 724 instead of operation 723. When the return period has not elapsed, the control device may return to operation 722 and waits until the return packet is received. When the return period elapses, the control device may determine whether the return procedure is terminated in operation 725. When the return procedure is not terminated, the control device may change a reception frequency for the return packet in operation 726 and performs operation 722 again. When the return procedure is terminated, the link set-up procedure may be terminated in operation 730.

Figure 8:
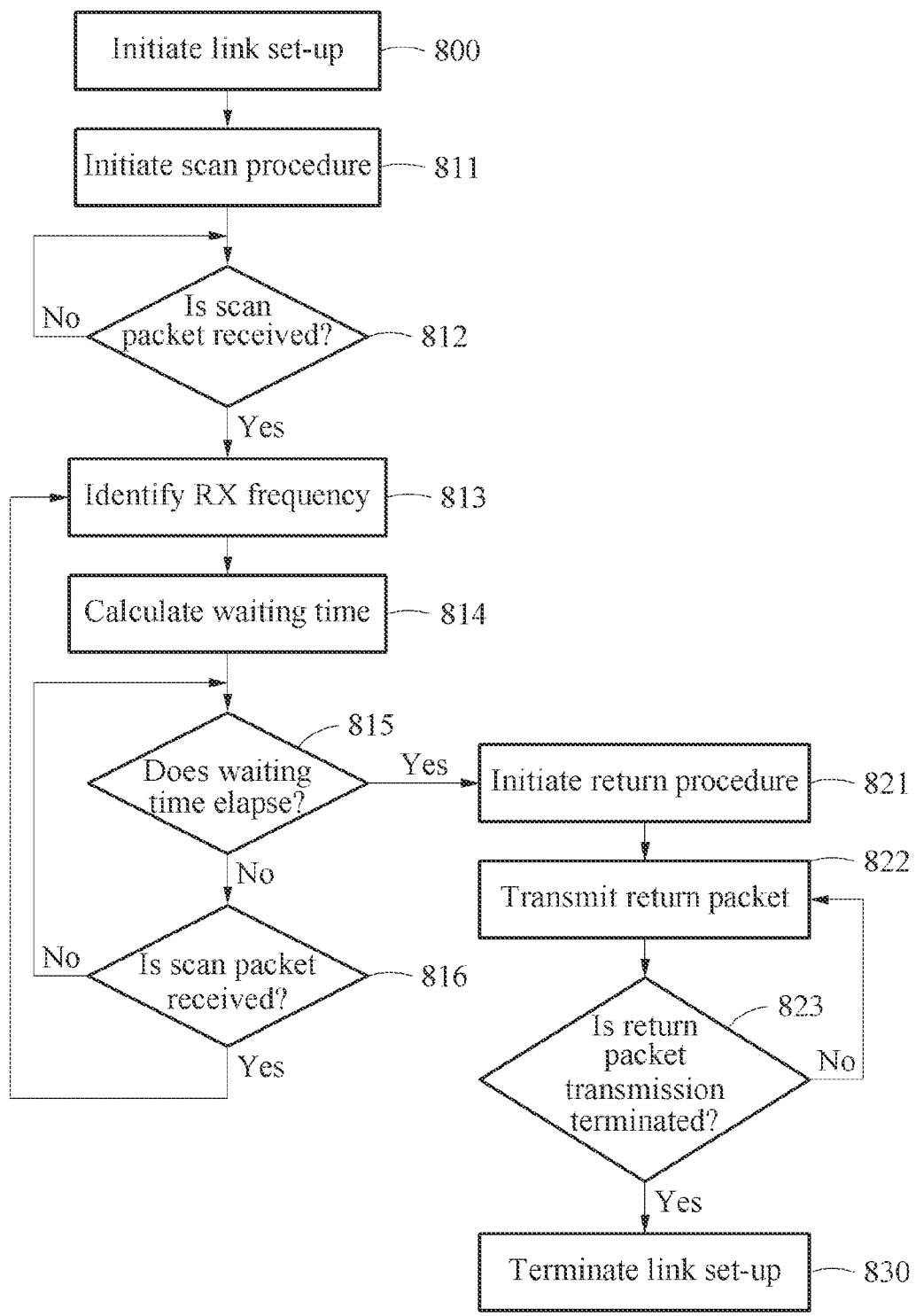
FIG. 8 illustrates an example of a link set-up procedure for a target device.

FIG. 8 illustrates an example of a link set-up procedure for a target device. Referring to FIG. 8, a link set-up may be initiated in operation 800. A scan procedure may be initiated in operation 811. In operation 812, a target device may determine whether a scan packet is received. When the scan packet is not received, the target device may repetitively perform operation 812. When the scan packet is received, the target device may identify a reception frequency in operation 813 and calculate a waiting time in operation 814. In operation 815, the target device may determine whether the waiting time elapses. When the waiting time has not elapsed, the target device may determine whether a scan packet is received in operation 816. When the scan packet is not received, the target device may repetitively perform operation 815. In other words, the target device may continuously check whether the scan packet is received until the waiting time elapses. When the scan packet is received, the target device may perform operations 813 and 814 based on a new scan packet. When a plurality of control devices is present, a new scan packet may be received. When the waiting time elapses, a return procedure may be initiated in operation 821.

The target device may transmit a return packet in operation 822 and determine whether the transmission of the return packet is terminated in operation 823. When the transmission of the return packet is not terminated, the target device may perform operation 822 again. The target device may repetitively transmit the return packet based on a return period while checking whether the transmission of the return packet is terminated in operation 823. When the transmission of the return packet is terminated, the link set-up procedure may be terminated in operation 830.

Figure 9:
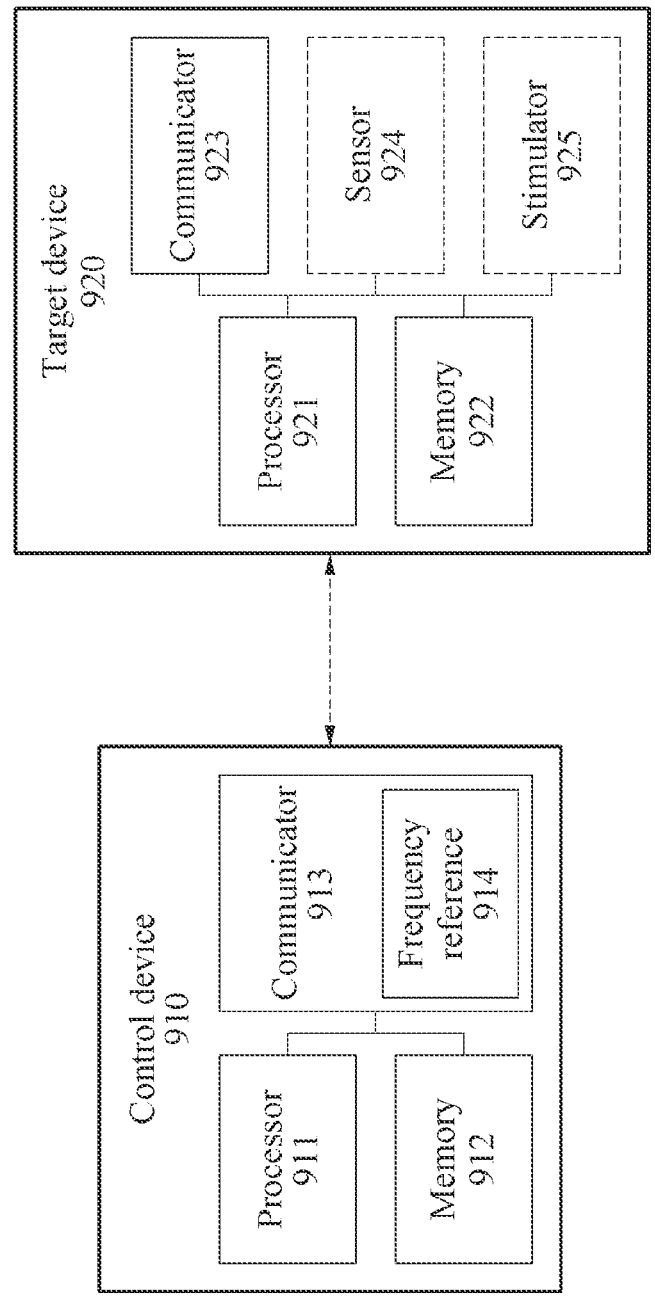
FIG. 9 illustrates an example of configurations of a control device and a target device.

FIG. 9 illustrates an example of configurations of a control device and a target device. Referring to FIG. 9, a control device 910 may include a processor 911 (e.g., one or more processors), a memory 912 (e.g., one or more memories), and a communicator 913. A target device 920 may include a processor 921 (e.g., one or more processors), a memory 922 (e.g., one or more memories), and a communicator 923.

The memory 912 may be connected to the processor 911 and store instructions to be executed by the processor 911, data to be computed by the processor 911, or data having been processed by the processor 911. The processor 911 may execute the instructions of the memory 912. In response to the execution, one or more operations of the control device 910 described with reference to FIGS. 1A through 8 and FIG. 10 may be performed. For example, the processor 911 may control the communicator 913 to perform a link set-up procedure according to examples.

The communicator 913 may use a frequency reference 914 to perform the link set-up procedure along with the target device 920. For example, the communicator 913 may sequentially transmit scan packets including information on current transmission frequencies to a target device while changing a transmission frequency of the control device within a scan frequency range, and receive, from the target device, a return packet including information on a reception frequency of the target device in association with the scan packets. The processor 911 may control the target device 920 based on an operating frequency of the target device 920 found through a link set-up.

The description that is given of the processor 911 and the memory 912 of the control device 910 may apply to the processor 921 and the memory 922 of the target device 920. Accordingly, one or more operations of the target device 920 described with reference to FIGS. 1A through 8 and FIG. 10 may be performed. The communicator 923 may perform the link set-up along with the control device 910 without using a circuit element corresponding to the frequency reference 914. For example, the communicator 923 may receive, from a control device, a scan packet including information on a transmission frequency of the control device and sequentially transmit, to the control device, return packets, each including information on a reception frequency of the target device.

The target device 920 may further include a sensor 924 and/or a stimulator 925. As an example, the target device 920 may correspond to a human body implantable device or a human body attachable device. In this example, the target device 920 may measure a biometric signal through the sensor 924 and transfer the measured biometric signal to the control device 910. Also, the target device 920 may apply a stimulation signal to a human body through the stimulator 925 under a control of the control device 910. As another example, the target device 920 may correspond to an Internet of Things (IoT) node. In this example, data on an environment around the target device 920 may be collected through the sensor 924 and provided to the control device 910. Also, another device around the target device 920 may be controlled in accordance with the control of the control device 910.

Figure 10:
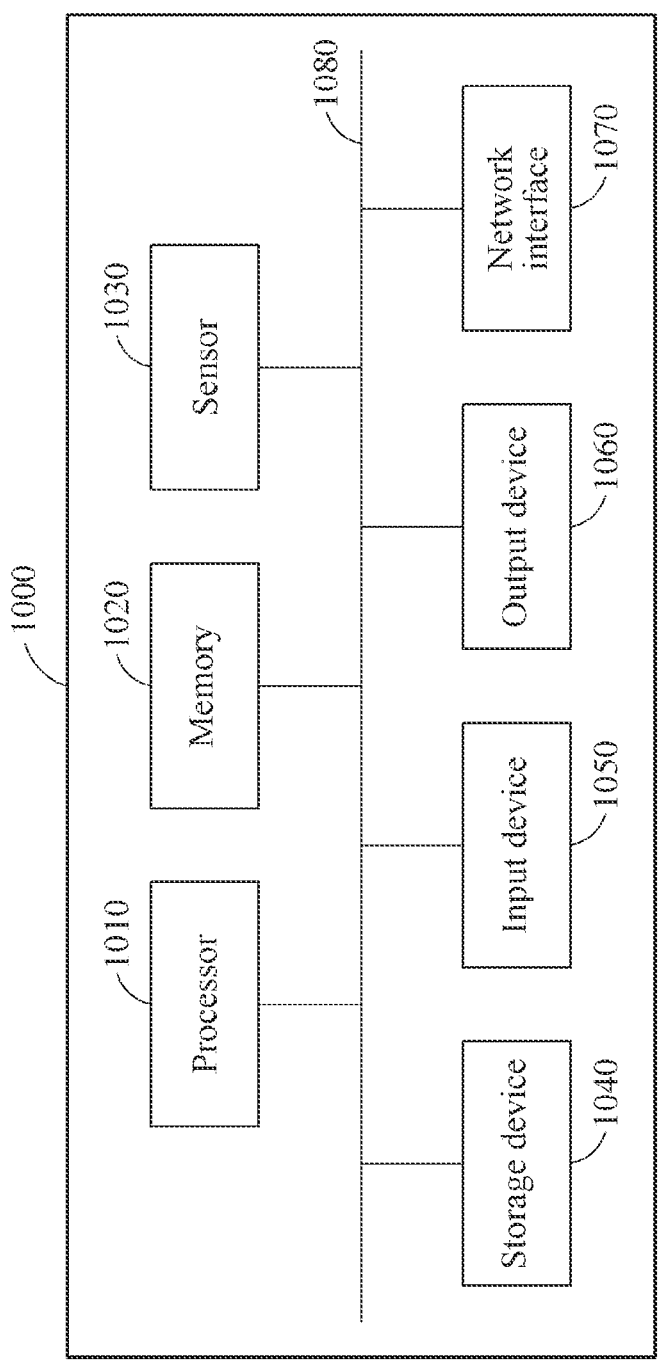
FIG. 10 illustrates an example of a configuration of an electronic device.

FIG. 10 illustrates an example of a configuration of an electronic device. Referring to FIG. 10, an electronic device 1000 may include a processor 1010 (e.g., one or more processors), a memory 1020 (e.g., one or more memories), a sensor 1030, a storage device 1040, an input device 1050, an output device 1060, and a network interface 1070. The processor 1010, the memory 1020, the sensor 1030, the storage device 1040, the input device 1050, the output device 1060, and the network interface 1070 may communicate through a communication bus 1080. For example, the electronic device 1000 may be implemented as a portion of a mobile device such as a mobile phone, a smartphone, a PDA, a netbook, a tablet computer, and a laptop computer a wearable device such as a smart watch, a smart band, and smart glasses, a computing device such as a desktop and a server, home appliances such as a television (TV) a smart TV, and a refrigerator, a security device such as a door lock, or a vehicle such as a smart car. Each of the control device 110 and the target device 120 of FIG. 1A may be implemented as a structural and/or functional part of the electronic device 1000.

The processor 1010 may execute functions and instructions for execution in the electronic device 1000. For example, the processor 1010 may process instructions stored in the memory 1020 or the storage device 1040. The processor 1010 may perform one or more operations described with reference to FIGS. 1A through 9, FIG. 11, and FIG. 12.

The memory 1020 may store data for a link set-up. The memory 1020 may include a computer-readable storage medium or a computer-readable storage device. The memory 1020 may store instructions to be executed by the processor 1010 and store relevant information while software and/or an application is executed by the electronic device 1000. The sensor 1030 may generate sensor data by sensing data around the electronic device 1000. The sensor 1030 may include, for example, an image sensor, an accelerometer sensor, a compass sensor, a GPS sensor, a gyro sensor, an odometer, and a geomagnetic sensor.

The storage device 1040 may include a computer-readable storage medium or a computer-readable storage device. The storage device 1040 may store a variety of data used in a link set-up procedure. The storage device 1040 may store a larger quantity of information compared to the memory 1020 and store information for a long time. The storage device 1040 may include, for example, a magnetic hard disk, an optical disk, a flash memory, a floppy disk, or other types of non-volatile memories that are known after an understanding of the present disclosure.

The input device 1050 may receive an input from a user based on a traditional input method using a keyboard and a mouse and a new input method such as a touch input, a voice input, and an image input. For example, the input device 1050 may include any device that detects an input from a keyboard, a mouse, a touch screen, a microphone, or a user and transfers the detected input to the electronic device 1000.

The output device 1060 may provide an output of the electronic device 1000 to a user through a visual, auditory, or tactile channel. The output device 1060 may include, for example, a display, a touch screen, a speaker, a vibration generating device, or any device for providing an output to a user. For example, the network interface 1070 may communicate with an external device through a wired or wired network.

Figure 11:
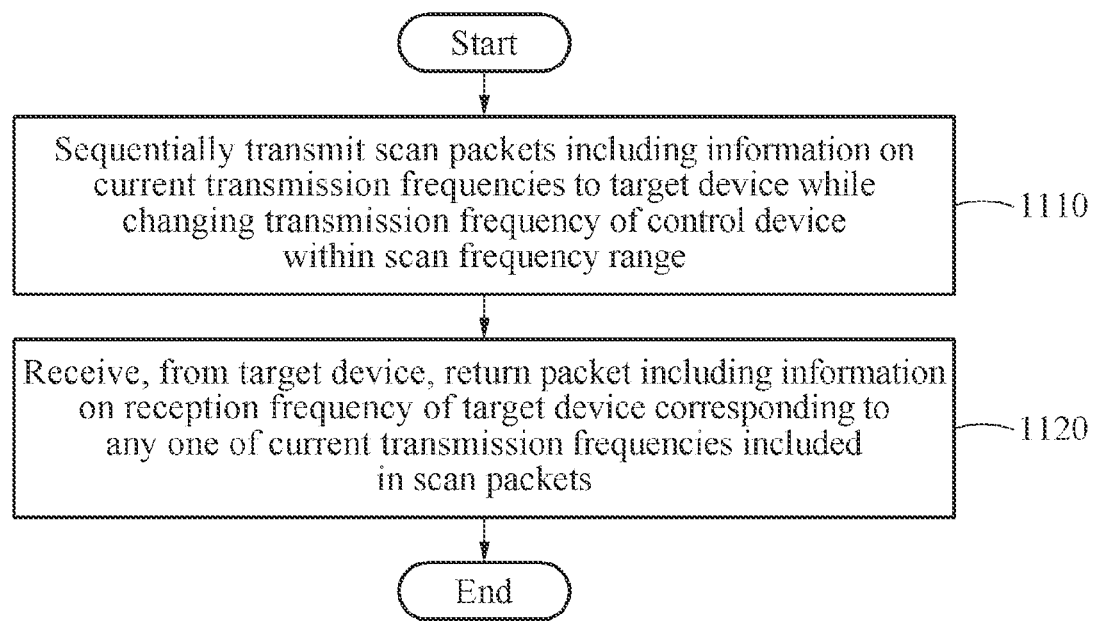
FIG. 11 illustrates an example of a communication process of a control device for a link set-up.

FIG. 11 illustrates an example of a communication process of a control device for a link set-up. Referring to FIG. 11, in operation 1110, a control device sequentially transmits scan packets including information on current transmission frequencies to a target device while changing a transmission frequency of the control device within a scan frequency range. In operation 1120, the control device receives, from the target device, a return packet including information on a reception frequency of the target device corresponding to any one of the current transmission frequencies included in the scan packets. In addition, the description of FIGS. 1A through 10 and FIG. 12 may apply to the communication process of the control device.

Figure 12:
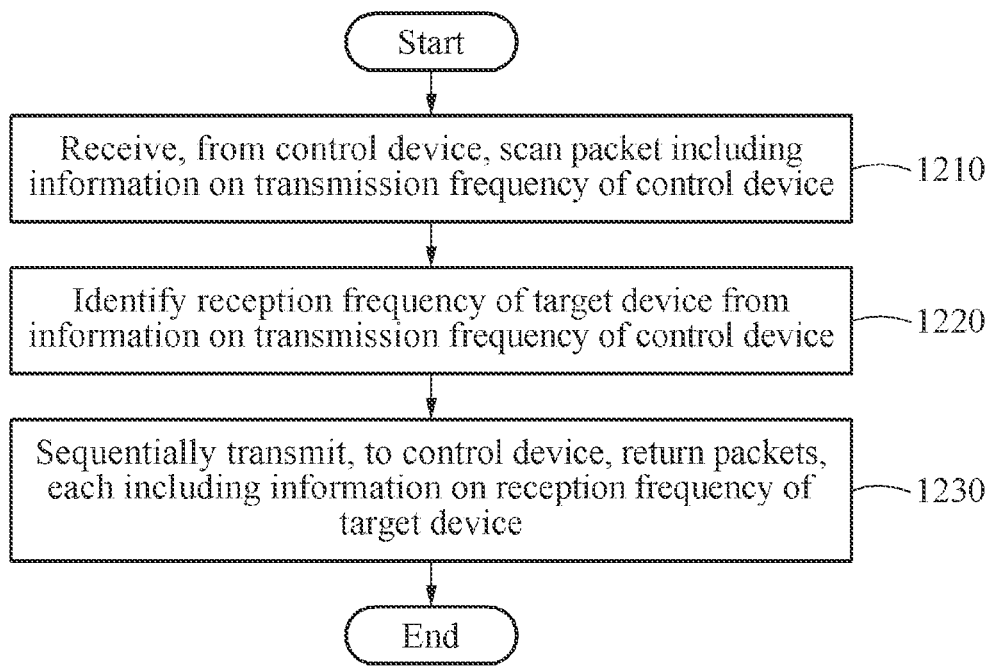
FIG. 12 illustrates an example of a communication process of a target device for a link set-up.

FIG. 12 illustrates an example of a communication process of a target device for a link set-up. Referring to FIG. 12, in operation 1210, a target device receives, from a control device, a scan packet including information on a transmission frequency of the control device. In operation 1220, the target device identifies a reception frequency of the target device from the information on the transmission frequency of the control device. In operation 1230, the target device sequentially transmits, to the control device, return packets, each including information on the reception frequency of the target device. In addition, the description of FIGS. 1A through 11 may apply to the communication process of the target device.

The communication systems, control devices, frequency references, target devices, dividers, comparators, XOs, controllers, VCOs, first target devices, second target devices, processors, memories, communicators, sensors, stimulators, electronic devices, storage devices, input devices, output devices, network interfaces, communication system 100, control device 110, frequency reference 111, target device 120, target device 130, frequency reference 131, frequency reference 150, divider 151, comparator 152, XO 153, controller 154, VCO 155, control device 210, target device 220, control device 310, target device 320, control device 410, target device 420, control device 510, target device 520, control device 610, first target device 620, second target device 630, control device 910, processor 911, memory 912, communicator 913, frequency reference 914, target device 920, processor 921, memory 922, communicator 923, sensor 924, stimulator 925, electronic device 1000, processor 1010, memory 1020, sensor 1030, storage device 1040, input device 1050, output device 1060, network interface 1070, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented communication method of a control device, the method comprising:
    sequentially transmitting scan packets, each comprising information of a current transmission frequency at which the scan packet is transmitted, to a target device while changing a transmission frequency of the control device within a scan frequency range, indicative of a set reception frequency of the control device; and
    receiving, from the target device, a return packet comprising information of a reception frequency of the target device identified by the target device from the information of any one of the current transmission frequencies included in the scan packets,
    wherein, in case a communication occurs between the control device and the target device without using a frequency reference of the control device, a difference occurs in the information of the reception frequency in the return packet from the set reception frequency of the control device indicated by the respective scan packet information of at least one scan packet received by the target, and
    wherein, in a state where an actual reception frequency of the target device is unknown due to the difference, the information of the any one of the current transmission frequencies included in the scan packets is used to identify the actual reception frequency of the target device.

2. The method of claim 1, wherein the receiving of the return packet comprises receiving the return packet while changing a reception frequency of the control device within a return frequency range.

3. The method of claim 1, wherein
    the received return packet corresponds to one of the return packets transmitted by the target device, and
    a transmission frequency of the target device is determined based on a reception frequency at which the control device receives the return packet.

4. The method of claim 1, wherein each of the scan packets further comprises return timing information comprising a total number of the scan packets, an index of a current scan packet, and a transmission period.

5. The method of claim 4, wherein the return packet is received after a waiting time indicated by the return timing information.

6. The method of claim 1, wherein the return packet further comprises identification information of the target device.

7. The method of claim 6, wherein, in response to a first link set-up between the control device and the target device and a second link set-up between the control device and another target device being performed simultaneously, the return packet is distinguished from another return packet of the other target device based on the identification information of the target device.

8. The method of claim 1, wherein each of the scan packets further comprises return procedure information comprising a total number of return packets and a return period.

9. The method of claim 8, wherein
    each of the return packets further comprises information of an index of a current return packet, and
    a waiting time remaining to a termination of a return procedure is identified based on the return procedure information and an index of the return packet.

10. The method of claim 1, further comprising:
    receiving, from a control device, one of the scan packets;
    identifying, by the target device, the actual reception frequency of the target device from the information of the current transmission frequency included in the one scan packet; and
    sequentially transmitting, to the control device, return packets including the return packet.

11. A non-transitory computer-readable record medium storing instructions that, when executed by a processor, configure the processor to perform the method of claim 1.

12. A processor-implemented communication method of a target device, the method comprising:
    receiving, from a control device, a scan packet comprising information of a transmission frequency at which the scan packet is transmitted by the control device, indicative of a set reception frequency of the control device;
    identifying an actual reception frequency of the target device from the information of the transmission frequency of the control device; and
    sequentially transmitting, to the control device, return packets, each comprising information of the reception frequency of the target device,
    wherein, in case a communication occurs between the control device and the target device without using a frequency reference of the control device, a difference occurs in the information of the reception frequency in the return packet from the set reception frequency of the control device indicated by the respective scan packet information of at least one scan packet received by the target, and wherein, in a state where the actual reception frequency of the target device is unknown due to the difference, the information of the any one of the current transmission frequencies included in the scan packets is used to identify the actual reception frequency of the target device.

13. The method of claim 12, wherein the received scan packet corresponds to one of scan packets transmitted by the control device at different frequencies within a scan frequency range, and each of the scan packets comprises information of a current transmission frequency.

14. The method of claim 12, wherein the scan packet further comprises return timing information comprising a total number of scan packets, an index of a current scan packet, and a transmission period.

15. The method of claim 14, wherein the return packets are transmitted after a waiting time indicated by the return timing information.

16. The method of claim 12, wherein each of the return packets further comprises identification information of the target device.

17. The method of claim 12, wherein the scan packet further comprises return procedure information comprising a total number of return packets and a return period.

\* \* \* \* \*